(12) United States Patent
Micheletti et al.

(10) Patent No.: US 10,981,101 B2
(45) Date of Patent: Apr. 20, 2021

(54) SYSTEM FOR SCRUBBING OR FILTERING A GAS STREAM

(71) Applicants: Giorgio Micheletti, Sant'Ambrogio di Valpolicella (IT); Erardo Mateo Mayer, Monza (IT)

(72) Inventors: Giorgio Micheletti, Sant'Ambrogio di Valpolicella (IT); Erardo Mateo Mayer, Monza (IT)

( * ) Notice: Subject to any disclaimer, the term of this patent is extended or adjusted under 35 U.S.C. 154(b) by 262 days.

(21) Appl. No.: 16/307,145

(22) PCT Filed: May 25, 2017

(86) PCT No.: PCT/IB2017/053077
§ 371 (c)(1),
(2) Date: Dec. 5, 2018

(87) PCT Pub. No.: WO2017/212364
PCT Pub. Date: Dec. 14, 2017

(65) Prior Publication Data
US 2019/0240610 A1 Aug. 8, 2019

(30) Foreign Application Priority Data
Jun. 9, 2016 (IT) .......................... 102016000059100

(51) Int. Cl.
*B01D 47/06* (2006.01)
*B05B 15/14* (2018.01)
(Continued)

(52) U.S. Cl.
CPC .............. *B01D 47/06* (2013.01); *B05B 15/14* (2018.02); *B05B 15/654* (2018.02); *B05B 15/68* (2018.02); *B05B 7/0483* (2013.01)

(58) Field of Classification Search
CPC ....... B01D 47/06; B05B 7/0483; B05B 15/14; B05B 15/68; B05B 15/654
(Continued)

(56) References Cited

U.S. PATENT DOCUMENTS 3,502,308 A * 3/1970 Simizu ................... B01D 47/10
261/64.1
3,577,709 A * 5/1971 Hoad ..................... B01D 47/06
96/237
(Continued)

FOREIGN PATENT DOCUMENTS

CN 204672060 U 9/2015
DE 2903754 A1 8/1980
(Continued)

*Primary Examiner* — Charles S Bushey
(74) *Attorney, Agent, or Firm* — Themis Law

(57) ABSTRACT

A gas stream scrubbing and/or filtration system using a pressurized working fluid includes a working chamber having an inlet and an outlet for the gas stream, and a first opening for entering the working fluid; a first feeding line of the working fluid having a spraying nozzle for spraying the working fluid inside the working chamber; and a mounting system of the nozzle on the working chamber at the first opening. In particular, the mounting system is configured to enable the nozzle to spray the working fluid inside the working chamber, passing through the first opening. The mounting system is further configured to provide access to the nozzle from outside of the working chamber, so as to allow an operator to easily perform maintenance, replacement and/or adjustments thereof.

7 Claims, 3 Drawing Sheets

(51) Int. Cl.
*B05B 15/654* (2018.01)
*B05B 15/68* (2018.01)
*B05B 7/04* (2006.01)

(58) Field of Classification Search
USPC .................................................. 261/115, 118
See application file for complete search history.

(56) References Cited

U.S. PATENT DOCUMENTS

| | | | | |
|---|---|---|---|---|
| 3,593,968 | A * | 7/1971 | Geddes | F28C 3/06 |
| | | | | 261/118 |
| 3,898,308 | A * | 8/1975 | Baum | B01D 47/10 |
| | | | | 261/69.1 |
| 4,083,932 | A * | 4/1978 | Muraco | B01D 47/06 |
| | | | | 239/290 |
| 4,127,621 | A * | 11/1978 | Berst | B01D 47/06 |
| | | | | 261/118 |
| 5,376,166 | A * | 12/1994 | Hoffmann | B01D 53/84 |
| | | | | 95/216 |
| 9,138,679 | B2 * | 9/2015 | Messineo | B01D 53/18 |
| 2020/0023400 | A1 * | 1/2020 | Fukaya | F16J 15/0818 |
| 2020/0206769 | A1 * | 7/2020 | Yoder | C10G 75/00 |

FOREIGN PATENT DOCUMENTS

| | | |
|---|---|---|
| JP | 2006255573 A | 9/2006 |
| NL | 31730 C | 9/2006 |

* cited by examiner

SYSTEM FOR SCRUBBING OR FILTERING A GAS STREAM

FIELD OF INVENTION

The present invention is generally applicable to the technical field of the gas stream scrubbing or filtration systems, particularly to the technical field of systems for such purposes using pressurized water and/or steam.

STATE OF THE ART

There are known gas stream scrubbing and/or filtration systems through a working liquid, which generally involve a duct or a tank containing such stream and a plurality of nozzles disposed internally to the tank to spray the working liquid towards the gas stream itself, e.g. low pressure water, generally between 1 and 30 bar.

With such known systems, in case of breakages, clogging or any circumstances which need the intervention on the nozzles, it is necessary to stop the plant, open the tank or duct and intervene on the parts of interest.

It is evident that this involves high costs, as well as the need for skilled workers.

Moreover, in the known systems, the nozzles are fixed and suitable to spray the working liquid in a predetermined direction.

SUMMARY OF THE INVENTION

The object of the present invention is to at least partially overcome the above-noted drawbacks, by providing a gas stream scrubbing and/or filtration system through a pressurized working fluid having a great efficiency and a relative cheapness.

Another object of the present invention is to provide a gas stream scrubbing and/or filtration system which allows to perform maintenance operations in a simple and cost-effective way.

Another object of the present invention is to provide a gas stream scrubbing and/or filtration system which allows to inspect the nozzles in a simple way.

Another object of the present invention is to provide a gas stream scrubbing and/or filtration system which allows an easy regulation of the working conditions.

Another object of the present invention is to provide a gas stream scrubbing and/or filtration system which allows a regulation of the working conditions without stopping its operation.

Such objects, as well as others which will become clearer hereinafter, are achieved by a system according to what is described and/or claimed and/or illustrated herein.

Advantageous embodiments of the invention are defined according to the dependent claims.

BRIEF DESCRIPTION OF THE DRAWINGS

Further features and advantages of the invention will be more evident in light of the detailed description of a preferred but not exclusive embodiment of the invention, illustrated by way of non-limiting example with the aid of the accompanying drawings tables, wherein.

DETAILED DESCRIPTION OF A PREFERRED EMBODIMENT

Referring to the accompanying figures, it is described a gas stream G scrubbing and/or filtration system 10 through a working fluid F, e.g. atomized water or very high pressure steam.

Particularly, the system 10 may comprise at least one tank or duct 2 for the gas stream G and a feeding line 30 of the working fluid F.

It is understood that the system 10 may be an integral part of a gas stream scrubbing and/or filtration plant G.

Thus, conveniently, the line 30 may include means 4 for pressurizing the working fluid F and means 5 for heating the working fluid F, e.g. a boiler.

Figure 1:
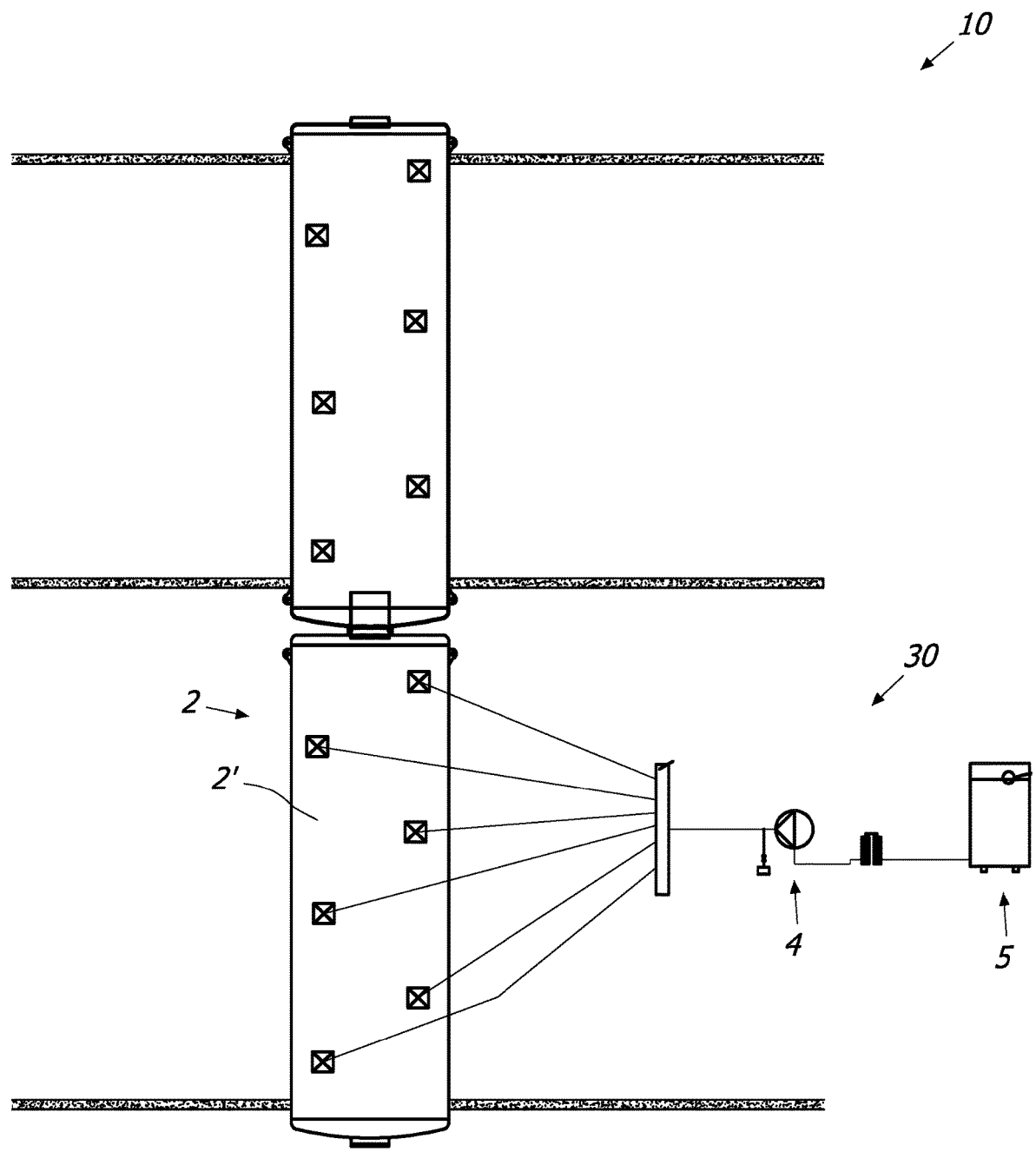
FIG. 1 is a schematic view of a system 10.

FIG. 1 is a schematic view of the gas stream G scrubbing and/or filtration system 10 passing through a tank 2. It is understood that such example is not limiting since the system 10 can be employed on ducts, equipment, portions of industrial plants without departing from the scope of protection of the present invention.

Figure 2:
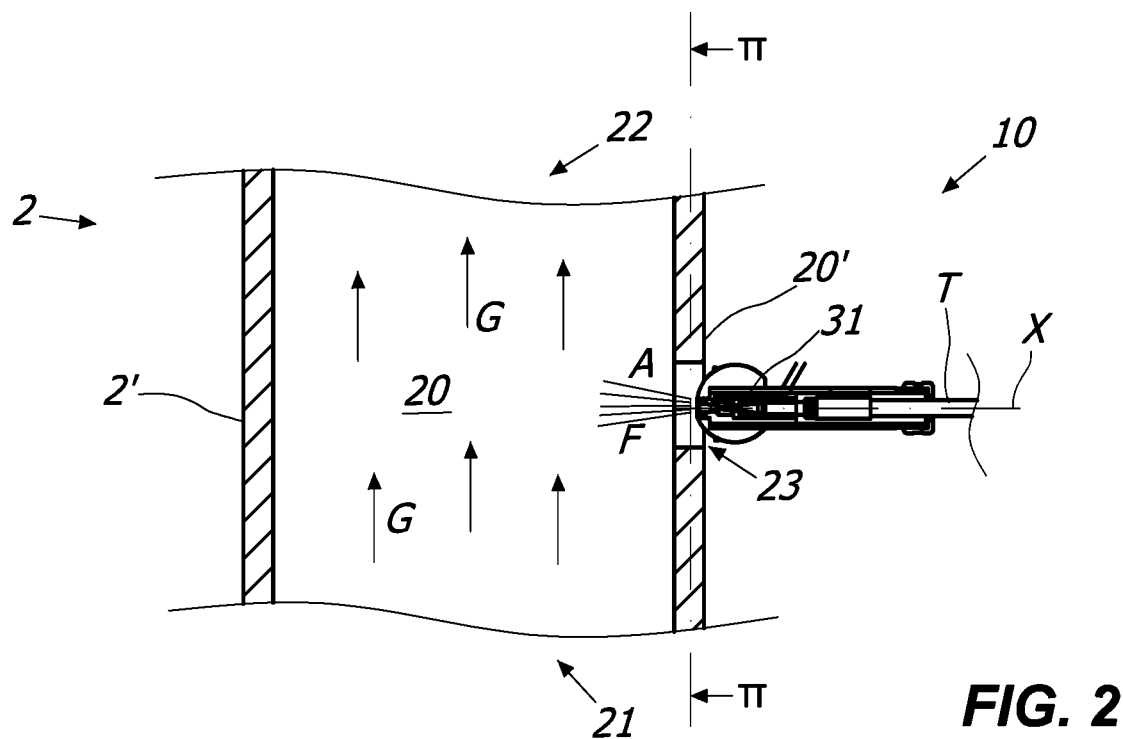
FIG. 2 is a schematic sectional view of some details of the system 10.

Particularly, as shown in FIG. 2, the system 10 can then comprise at least one working chamber 20 disposed internally to the tank 2, which may have at least one inlet 21 and one outlet 22 for the gas stream G and at least one first opening 23 for entering the working fluid F inside thereof.

Conveniently, the feeding line 30 may include at least one spraying nozzle 31 for spraying the working fluid F inside the working chamber 20 so that the latter passes through the opening 23.

The latter can be a through hole formed in the wall 2' of the tank 2 so as to allow the nozzle 31 to spray the working fluid F inside thereof.

Depending on the need, the nozzle 31 may be a high pressure nozzle, e.g. the pressure of the working fluid L coming out from thereof may vary between 200 bar and 2000 bar and/or may be an atomisation nozzle whose outflow can have drops with a diameter ranging between 5 μm and 90 μm.

According to an aspect of the invention, the system 10 may comprise mounting means 40 for mounting the nozzle 31 on the working chamber 20 so that the first sprays inside the second. Preferably, the mounting means 40 may be configured such that the nozzle 31 remains outside the working chamber 20. More specifically, the entire feeding line 30 may be arranged outside the working chamber 20.

The mounting means 40 can thus be configured so that the nozzle 31 is placed at the opening 23 so that the first sprays the working fluid F inside the working chamber 20 through the second.

Possibly, also the mounting means 40 may be disposed outside the working chamber 20.

Thanks to such characteristics, the gas stream G may pass inside the working chamber 20 without being subject to unwanted flow variations due to the presence of nozzles 31 and/or the relative pipes inside the working chamber 20 itself.

Moreover, in this way, the nozzles 31 and the mounting means 40 which could be damaged by the passage of the gas stream G can be preserved, so as to give the system 10 a high durability.

Advantageously, moreover, the operator may access from the outside the feeding line 30, and, in particular, the nozzle 31, so that the operations of maintenance, control or replacement of the nozzle 31 itself, and, more generally, of the system 10, are particularly simple and fast.

The mounting means 40 may comprise a supporting structure 90 which may include at least one seat 42 for the nozzle 31.

Conveniently, the nozzle 31 may be inserted inside the seat 42 in a removable way.

More in detail, the supporting structure 90 may comprise at least one tubular element 80 defining an axis X, which may internally include said seat 42.

The supporting structure 90 may include a through hole 44 for housing the tubular element 80. Particularly, the through hole 44 may have an outlet 45" for the working fluid placed at the opening 23 of the working chamber 20. In this way, when the nozzle 31 is inserted in the seat 42, it may spray the working fluid F towards the inside of the working chamber 20 through the opening 23 itself, preferably the jet flowing from the nozzle 31 may have a substantially coaxial development to the axis X itself.

On the other hand, the opening 23 may define a plane n which may be substantially transverse with respect to the axis X itself.

In other words, the jet flowing from the nozzle 31 may have a spraying direction inside the working chamber 20 depending on the inclination of the axis X with respect to the plane π so as to achieve an equicurrent, countercurrent or tangential scrubbing and/or filtration.

According to a particular aspect of the invention, the mounting means 40 may be configured to allow the axis X inclination to be varied with respect to the plane π so as to vary the spraying direction of the working fluid F inside the working chamber 20.

In other words, the axis X can rotate with respect to the plane π, i.e. it may rotate with respect to the working chamber 20 so as to adjust the spraying direction inside the working chamber 20.

Conveniently, therefore, the supporting structure 90 may comprise a spheroidal element, preferably a sphere 43 which may have a diameter substantially greater than the diameter of the opening 23 of the working chamber 20.

Particularly, the sphere 43 may include the through hole 44. Particularly, the latter can accommodate the tubular element 80 so that, once the nozzle 31 is inserted in the seat 42, the tubular element 80 rotates integrally with the spheroidal element 43 to vary the spraying direction of the jet of the working fluid F inside the working chamber 20.

Possibly, the hole 44 may be eccentric with respect to the sphere 43 to obtain a larger variation of the spraying jet direction flowing from the nozzle 31 into the working chamber 20.

In any case, the outlet 45" of the hole 44 itself may be at the opening 23 of the working chamber 20.

The supporting structure 90 may comprise a plate-shaped element 62 which may be operatively coupled with the working chamber 20 so as to lock the sphere 43 in a removable and selectable way on the latter, so as to prevent the detachment and/or the rotation.

Particularly, the sphere 43 may thus be interposed between the plate-shaped element 62 and the working chamber 20.

Conveniently, the plate-shaped element 62 and the sphere 43 may be operatively coupled to reciprocally move between a resting configuration in which the sphere 43 is free to rotate and a working configuration in which such rotation is stopped.

More in detail, as shown in the accompanying figures, the plate-shaped element 62 may have a through opening 63 having a diameter substantially smaller than the diameter of the sphere 43 and substantially larger than the diameter of the through hole 44.

Particularly, the sphere 43 may be interposed between the plate-shaped element 62 and the working chamber 20 so that the inlet 45' of the through hole 44 is at the opening 63 of the plate-shaped element 62.

In this way, the tubular element 80 may be inserted into the through hole 44 through said opening 63.

According to a further aspect of the invention, the mounting means 40 comprise at least one platen-shaped element 64 having a respective through opening 65 which may be integrally coupled with the working chamber 20 so that the through opening 65 is at the opening 23 of the working chamber 20 itself.

The plate-shaped element 64 may be, for example, a flange screwed, glued or welded on the outer wall 20' of the working chamber 20.

Particularly, the opening diameter 65 of the plate-shaped element 64 may be substantially lower than the diameter of the sphere 43. Preferably, the inner edge 65' may be substantially frusto-conical or counter-shaped with respect to the sphere 43 so as to define a conical seat for the latter.

On the other hand, also the inner edge 63' of the plate-shaped element 62 may be substantially frusto-conical or counter-shaped with respect to the sphere 43 with a concavity opposite to the edge 65'.

Possibly, lubricating means 66 of known type may be provided, e.g. an oil or grease feeding line, to facilitate the rotation of the sphere 43 with respect to the plate-shaped element 62. Particularly, such lubricating means 66 may be of automatic type or may be configured to be manually operated by the operator.

Conveniently, the sphere 43 may be interposed between the plate-shaped elements 62, 64 so that the outlet 45" and the opening 65 are positioned at the opening 23 and so that the inlet 45' is positioned at the opening 63.

An anti-friction element 67 may also be provided, e.g. a ring element, interposed between the sphere 43 and the inner edge 65' of the plate-shaped element 64 so as to facilitate the sphere 43 rotation with respect to the first one.

According to a further aspect of the invention, the mounting means 40 may be mounted on the outer wall 20' of the work chamber 20 at the opening 23 so that the gas stream G does not come out through the same opening 23.

To this end, a gasket 50 may be provided, e.g. an elastomeric ring element, interposed between the plate-shaped element 64 and the outer part 20' of the working chamber 20 to prevent the gas stream G from coming out.

Figure 3:
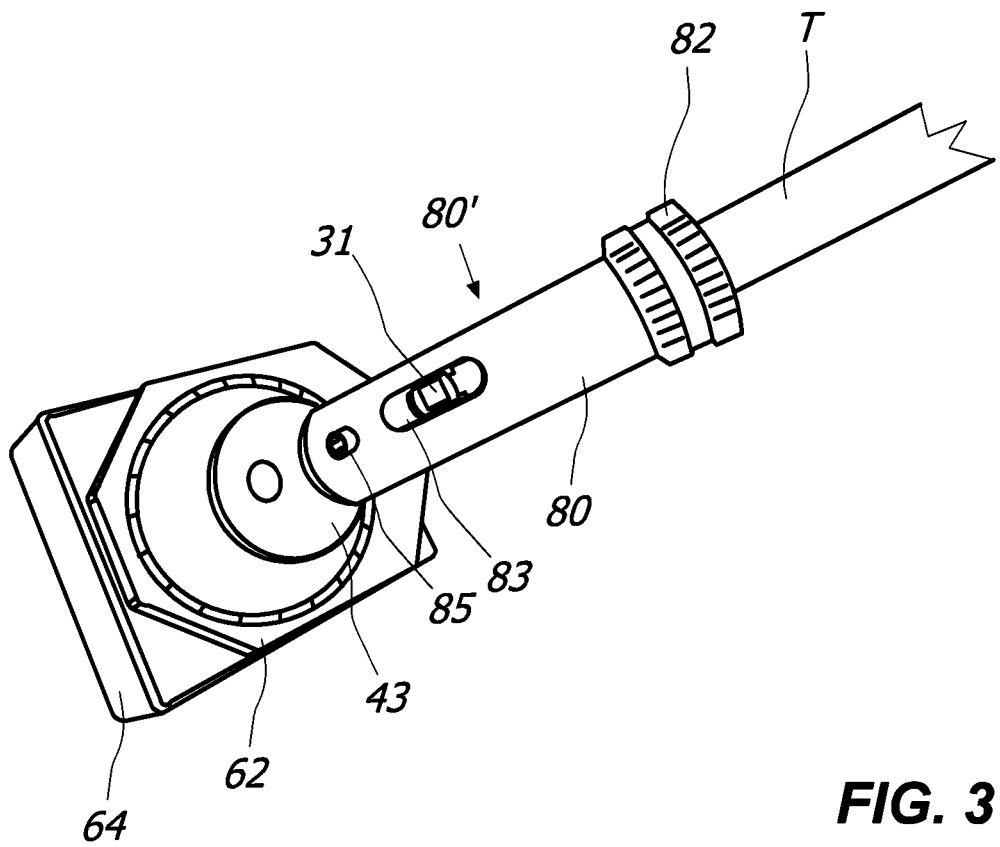
FIG. 3 is an axonometric view of some details of the system 10.

As particularly shown in FIG. 3, the plate-shaped element 62 may be slidably coupled to the plate-shaped element 64 so as to vary their mutual distance between a proximal position, corresponding to the working configuration, and a distal position, corresponding to the resting configuration.

For example, a pair of screws 70 passing through the plate-shaped element 62, whereas the plate-shaped element 64 might comprise a pair of counter-threaded seats 70' for the screws 70. The latter ones can be configured so that the unscrewing/screwing of the screws 70 causes the mutual distance variation of the plate-shaped elements 62, 64 between the proximal and distal positions, i.e. in such a way as to allow/not allow the rotation of the sphere 43.

In order to safeguard the integrity of the system 10, elastic contrast means 71 interposed between the plate-shaped elements 62, 64, e.g. compression springs coaxially disposed with respect to the screws 70 and interposed between the plate-shaped elements 62, 64 themselves may also be provided.

According to a further aspect of the invention, the tubular element 80 may comprise at least one portion 80' which can be grabbed and moved by the operator himself, thus changing the seat 42 inclination. Advantageously, in this way, the operator will be able to quickly and easily adjust the spraying direction without interrupting the spraying of the working fluid F inside the working chamber 20.

In addition, in order to obtain a more precise adjustment of the spraying direction of the working fluid L, the system 10 may comprise a goniometric scale, disposed on the outside, next to the sphere 43, preferably on the plate 62 close to the edge 63'.

The feeding line 30 may comprise a rigid duct 32 disposed close to the nozzle 31, preferably integral with the latter. Particularly, the rigid duct 32 may be inserted in the seat 42 so as to be positioned close to the tubular element 80.

More particularly, the nozzle 31 and the rigid duct 32 can be removably inserted into the seat 42 by sliding, so as to make the mounting and/or maintenance operations 10 of the system particularly simple.

In order to avoid the accidental disengagement of the elements from the seat, selective locking means may also be provided, e.g. a grub screw 81, passing through the tubular element 80 to interact with the rigid duct 32 in order to tighten the second element to the first.

Advantageously, also the grub screw 81 may also be disposed so as to allow the operator to operate it from the outside without being obliged to completely disassemble the mounting means 40.

The feeding line 30 may comprise a duct for the working fluid F, e.g. a high pressure flexible hose T which may be at least partially inserted, by sliding, into the seat 42, upstream of the rigid duct 32 and coupled with the latter.

Conveniently, a ring 82 might be provided in order to mutually secure the flexible hose T and the tubular element 80 so as to prevent the disengagement of the flexible hose T itself.

According to a further aspect of the invention, the tubular element 80 may comprise at least one transversal opening 83 to inspect the nozzle 31. Particularly, the operator may operate the grub screw 81 to allow the nozzle 31 itself to slide within the seat 42 between a working position in which the working fluid F is sprayed into the working chamber 20 and an inspection position in which it is at the opening 83 so that the operator from the outside can inspect the nozzle 31 to check its wear condition and/or its correct operation.

In other words, the operator can, advantageously, inspect the nozzle 31 without disassembling the system 10.

The system 10 may also comprise a feeding line 35 for an additive A to the working fluid F in order to spray a mixture thereof into the working chamber 20. Such an additive may be, for instance, an oxidizing substance.

Figure 4:
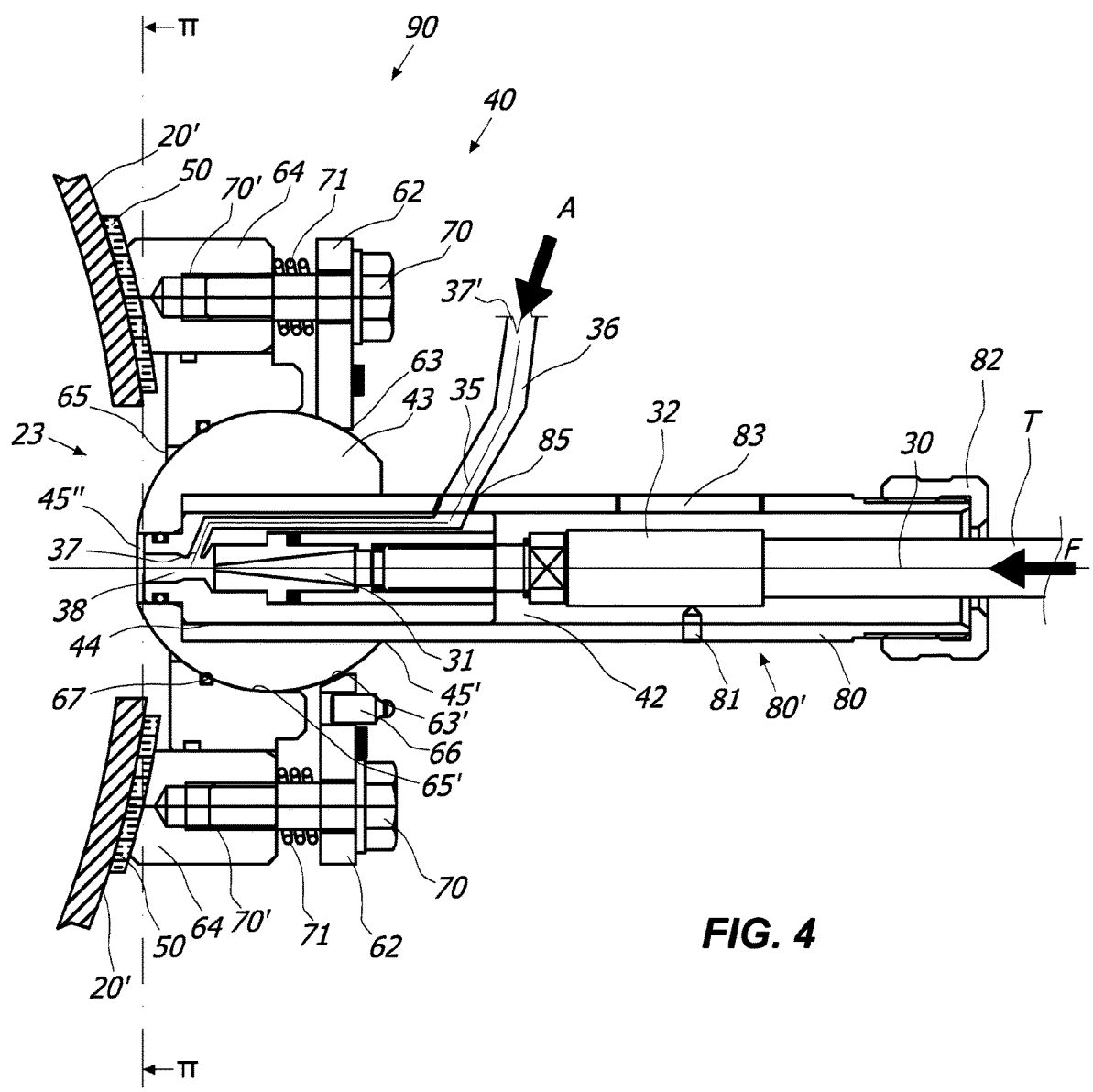
FIG. 4 is an enlarged sectional view of some details of the system 10.

Particularly, the feeding line 35 may pass through the seat 42. For instance, a special duct 36 for the additive A may be provided, having an outlet 37 placed inside the seat 42. To this end, as particularly shown in FIG. 4, the tubular element 80 may thus comprise an opening 85 for the duct 36 so that the latter has the outlet 37 disposed inside the seat 42 and an inlet 37' for the additive A disposed outside the seat 42 itself.

In this way, the inclination of the seat 42, as well as the spraying direction of both the working fluid F and the additive A, may be varied without interrupting the operation of the system 10.

According to a particular aspect of the invention, a "Venturi effect" mixing chamber 38 may be provided, inside which the feeding line 30 and the feeding line 35 may flow so as to mix the additive A and the working fluid F before they enter the working chamber 20 so that a mixture of additive A and working fluid F may be sprayed into the chamber.

It will be understood that the system 10 may comprise a plurality of nozzles 31 fluidly connected to a single feeding line 30, 35 each of them intended for spraying into said working chamber 20 or in a respective working chamber. In other words, as schematically illustrated in FIG. 1, the nozzles 31 may be arranged in different positions along the duct 2.

Possibly, the system 10 may comprise a plurality of feeding lines 30, 35 having each one or more spraying nozzles 31 without thereby departing from the scope of protection of the present invention.

As appears clearly from the above description, the invention achieves the intended objects.

The invention may be subject to many changes and variations, which are all included in the appended claims. Moreover, all the details may furthermore be replaced by other technically equivalent elements, and the materials may be different depending on the needs, without departing from the scope of protection of the invention defined by the appended claims.

The invention claimed is:

1. A system for scrubbing and/or filtering a gas stream by a pressurized working fluid, the system comprising:
   at least one working chamber having at least one inlet and at least one outlet for the gas stream, and at least one first opening providing an inflow of the working fluid;
   at least one first feed line of the working fluid, which includes at least one spray nozzle to spray the working fluid within said at least one working chamber; and
   a mounting system of said at least one nozzle onto said at least one working chamber at said at least one first opening,
   wherein said mounting system is configured to enable said at least one nozzle to spray the working fluid within said at least one working chamber, the working fluid passing through said at least one first opening, said mounting system being further configured to provide access to said at least one nozzle from outside with respect to said at least one working chamber, so as to enable an operator to easily perform maintenance, replacement, or adjustment operations thereon,
   wherein said mounting system is at least partially arranged externally to said working chamber, said mounting system being further configured so that said at least one nozzle is placed externally to said working chamber at the at least one first opening so that a flow of the gas stream does not invest said at least one nozzle;
   wherein said mounting system comprises a support structure with at least one seat defining an axis for said at least one nozzle, said at least one nozzle being removably inserted in the at least one seat to spray the working fluid into said working chamber, and
   wherein said support structure comprises at least one tubular element that defines said axis and that internally includes said at least one seat, said at least one tubular element further including at least one second pass-through opening transverse with respect to said axis, said at least one nozzle being slidable in said at least one tubular element between a working position, wherein said at least one nozzle, sprays the working fluid within said at least one working chamber, and a checking position, wherein said at least one nozzle is at said at least one second opening to enable the operator to check a correct operation of said at least one nozzle.

2. The system according to claim 1, wherein said mounting system comprises a member adapted to selectively lock said at least one nozzle in said at least one seat to avoid an unwanted disengaging of the at least one nozzle from the at least one seat.

3. The system according to the claim 2, wherein said at least one feed line comprises a rigid tubular duct integrally coupled with said at least one nozzle and adapted to be inserted in said at least one tubular element, said locking member acting through the at least one tubular element to lock said rigid tubular duct in said at least one seat.

4. The system according to claim 1, wherein said at least one first opening defines a plane, said mounting system being configured to allow adjusting an inclination of said axis with respect to said plane so as to vary a spray direction of said at least one nozzle without removing the said at least one nozzle from said at least one seat or without interrupting the inflow of the working fluid in said at least one working chamber.

5. The system according to claim 4, wherein said mounting system comprises a spheroidal element rotatably coupled to said working chamber at said at least one first opening, said spheroidal element comprising a pass-through hole which houses said at least one tubular element, so that the at least one tubular element rotates integrally with said spheroidal element to vary the spray direction of said at least one nozzle.

6. The system according to claim 5, wherein said mounting system comprises at least one first plate-shaped element mounted on said at least one working chamber, said at least one first plate-shaped element and said spheroidal element being operatively coupled so as to reciprocally move between a rest configuration. wherein said at least one spheroidal element is free to rotate, and a working configuration, wherein rotation is locked.

7. The system according to claim 1, further comprising at least one second feed line for an additive, said at least one seat further comprises a mixing chamber, said at least one first feed line and said at least one second feed line flowing into said mixing chamber so as to mix the additive and the working fluid and to spray into said at least one working chamber a mixture of the additive and the working fluid.

* * * * *